(12) United States Patent  (10) Patent No.: US 9,305,022 B2
Campbell et al.  (45) Date of Patent: *Apr. 5, 2016

(54) SYSTEM AND METHOD FOR ASSOCIATING A GEOGRAPHIC LOCATION WITH AN INTERNET PROTOCOL ADDRESS

(71) Applicant: Yahoo! Inc., Sunnyvale, CA (US)

(72) Inventors: Bruce Campbell, Hertfordshire (GB); Devesh Patel, Cupertino, CA (US); Soren Riise, Ruislip (GB)

(73) Assignee: Yahoo! Inc., Sunnyvale, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/092,451

(22) Filed: Nov. 27, 2013

(65) Prior Publication Data

US 2014/0156622 A1   Jun. 5, 2014

Related U.S. Application Data

(63) Continuation of application No. 11/729,364, filed on Mar. 28, 2007, now Pat. No. 8,621,064.

(51) Int. Cl.
| | |
|---|---|
| *G06F 15/173* | (2006.01) |
| *G06F 17/30* | (2006.01) |
| *H04W 4/02* | (2009.01) |
| *H04L 29/08* | (2006.01) |

(52) U.S. Cl.
CPC .... *G06F 17/30241* (2013.01); *G06F 17/30864* (2013.01); *H04L 67/18* (2013.01); *H04L 67/20* (2013.01); *H04W 4/02* (2013.01)

(58) Field of Classification Search
CPC .......................................................... H04L 67/18
USPC .................................................. 709/224, 227
See application file for complete search history.

(56) References Cited

U.S. PATENT DOCUMENTS

| | | | |
|---|---|---|---|
| 6,665,715 B1 * | 12/2003 | Houri ...................... | H04L 29/06 709/204 |
| 7,296,088 B1 | 11/2007 | Padmanabhan et al. | |
| 7,624,101 B2 | 11/2009 | Lin et al. | |
| 8,621,064 B2 | 12/2013 | Campbell | |
| 2002/0143991 A1 | 10/2002 | Chow et al. | |
| 2002/0199018 A1 * | 12/2002 | Diedrich ................. | H04L 29/06 709/245 |
| 2003/0074471 A1 | 4/2003 | Anderson et al. | |

(Continued)

OTHER PUBLICATIONS

U.S. Appl. No. 11/729,364: Transmittal of New Application filed Mar. 28, 2007, 51 Pages.

(Continued)

*Primary Examiner* — Joon H Hwang
*Assistant Examiner* — Sherman Lin
(74) *Attorney, Agent, or Firm* — Berkeley Law & Technology Group LLP

(57) ABSTRACT

The present application is directed to systems and methods for associating a geographic location with an IP address. Generally, an IP address from which each of a plurality of users accesses a network is recorded. A geo tag is associated with each of the plurality of users and a subset of the plurality of users is identified, the subset including users associated with a first IP address. The subset of the plurality of users is clustered into a spatial cluster including users associated with geo tags located with a defined distance of a geo tag of at least one other user of the cluster. A geographic location associated with a geographic center of the cluster is then associated with the first IP address.

20 Claims, 12 Drawing Sheets

(56) References Cited

U.S. PATENT DOCUMENTS

| | | | |
|---|---|---|---|
| 2004/0236730 A1 | 11/2004 | Frank | |
| 2005/0180647 A1 | 8/2005 | Curry et al. | |
| 2005/0278378 A1 | 12/2005 | Frank | |
| 2006/0106778 A1* | 5/2006 | Baldwin | G06F 17/3087 |
| 2007/0115998 A1 | 5/2007 | McElligott | |
| 2007/0179792 A1* | 8/2007 | Kramer | G06Q 30/02 705/1.1 |
| 2008/0010605 A1 | 1/2008 | Frank | |

OTHER PUBLICATIONS

U.S. Appl. No. 11/729,364: Filing Receipt, Mailed Apr. 20, 2007, 3 Pages.
U.S. Appl. No. 11/729,364: Filing Receipt, Mailed Apr. 19, 2007, 3 Pages.
U.S. Appl. No. 11/729,364: Notice of Publication, Mailed Oct. 2, 2008, 1 Page.
U.S. Appl. No. 11/729,364: Non-Final Rejection, Mailed Jun. 22, 2009, 24 Pages.
U.S. Appl. No. 11/729,364: Amendment/Req. Reconsideration—After Non-Final Reject, Mailed Jul. 14, 2009, 15 Pages.
U.S. Appl. No. 11/729,364: Final Rejection, Mailed Nov. 12, 2009, 35 Pages.
U.S. Appl. No. 11/729,364: Response After Final Action, Mailed Jan. 12, 2010, 13 Pages.
U.S. Appl. No. 11/729,364: Advisory Action, Mailed Jan. 27, 2010, 4 Pages.
U.S. Appl. No. 11/729,364: Response After Final Action, Applicant Arguments/Remarks made in an Amendment, Mailed Feb. 11, 2010, 8 Pages.
U.S. Appl. No. 11/729,364: Pre-Brief Conference Request, Notice of Appeal Filed on Feb. 12, 2010, 8 Pages.
U.S. Appl. No. 11/729,364: Advisory Action, Mailed Feb. 23, 2010, 3 Pages.
U.S. Appl. No. 11/729,364: Pre-Brief Appeal Conference Decision, Mailed Mar. 26, 2010, 2 Pages.
U.S. Appl. No. 11/729,364: Non-Final Rejection, Mailed Jun. 23, 2010, 23 Pages.
U.S. Appl. No. 11/729,364: Amendment/Req. Reconsideration—After Non-Final Reject, Mailed Sep. 22, 2010, 29 Pages.
U.S. Appl. No. 11/729,364: Non-Final Rejection, Mailed Dec. 8, 2010, 23 Pages.
U.S. Appl. No. 11/729,364: Amendment/Req. Reconsideration—After Non-final Reject, Extension of Time, Mailed Apr. 6, 2011, 14 Pages.
U.S. Appl. No. 11/729,364: Final Rejection, Mailed Jun. 21, 2011, 25 Pages.
U.S. Appl. No. 11/729,364: Request for Continued Examination, Mailed Sep. 19, 2011, 14 Pages.
U.S. Appl. No. 11/729,364: Power or Attorney, Mailed Nov. 1, 2011, 2 Pages.
U.S. Appl. No. 11/729,364: Non-Final Rejection, Mailed Mar. 28, 2012, 20 Pages.
U.S. Appl. No. 11/729,364: Amendment/Req. reconsideration—After Non-Final Reject, Mailed Jun. 28, 2012, 15 Pages.
U.S. Appl. No. 11/729,364: Electronic Terminal Disclaimer—Filed, Application No. Mailed Aug. 1, 2013, 3 Pages.
U.S. Appl. No. 11/729,364: Notice of Allowance and Fees Due, Mailed Aug. 23, 2013, 19 Pages.
U.S. Appl. No. 11/729,364: Issue Fee Payment, Amendment after Notice of Allowance, Mailed Nov. 25, 2013, 12 Pages.
U.S. Appl. No. 11/729,364: Issue Notification, Mailed Dec. 11, 2013, 1 Page.

* cited by examiner

SYSTEM AND METHOD FOR ASSOCIATING A GEOGRAPHIC LOCATION WITH AN INTERNET PROTOCOL ADDRESS

RELATED APPLICATIONS

This application claims the benefit of and priority to U.S. Non-Provisional patent application Ser. No. 11/729,364, entitled "A SYSTEM AND METHOD FOR ASSOCIATING A GEOGRAPHIC LOCATION WITH AN INTERNET PROTOCOL ADDRESS," filed on Mar. 28, 2007, which is assigned to the assignee hereof and which is expressly incorporated herein by reference. The present application is also related to U.S. patent application Ser. No. 11/729,377, filed on Mar. 28, 2007, and U.S. patent application Ser. No. 11/729,365, filed on Mar. 28, 2007, which is also expressly incorporated herein by reference.

BACKGROUND

Field

Devices such as personal computers, servers, and handheld devices that access computer networks utilizing protocols such as the TCP/IP protocol are typically assigned an Internet Protocol Address ("IP address") that identifies the device. An IP address is a unique number that may be assigned to a single device, or is shared by multiple client devices, and provides the ability to route data over a network to and from a specific device.

Internet standards governing bodies such as the American Registry for Internet Numbers ("ARIN") provide blocks of IP addresses to Internet service providers. When a user provided Internet service by an Internet service provider interacts with webpages available on the Internet, the user sends various requests to a website provider that include an IP address of the block of IP addresses provided to the Internet service provider. Because the Internet service provider may provide Internet service to more users than the number of IP addresses provided to the Internet service provider, it may appear that more than one user is using a single IP address. Thus, it is often difficult to determine a location of a user submitting a request based on an IP address associated with the user because many different users in different geographic locations may use the same IP address.

Internet search engines such as Yahoo!, and online advertisement service providers such as Yahoo! Search Marketing, often desire to determine a location of a user submitting a search query, or a location of a user receiving a digital ad, so that the Internet search engine or the online advertisement service provider can better tailor search results or digital ads to the potential interests of a user. For example, depending on a local intent of a search query, an Internet search engine may desire to serve search listings with information specifically tailored to the location of the user. Similarly, an online advertisement service provider may desire to serve digital ads such as banner ads or sponsored search listings to a user regarding a store, or products and services, that are actually located near a user receiving the digital ad.

Due to the increased interest in targeting search results and digital ads based on a location of a user, improved methods for determining a location of a user based on an IP address received with a search query or a digital ad request are desirable.

DETAILED DESCRIPTION

The present disclosure is directed to systems and methods for associating a geographic location with an IP address. Associating a geographic location with an IP address provides Internet search engines and online advertisement service providers ("ad providers") the ability to better target search results and digital ads based on a location of a user. The present disclosure describes systems and methods for associating a geographic location with an IP address based on, e.g., user activity associated with registered users, user activity associated with browser cookies, and a local intent of search queries received at a search engine.

Figure 1:
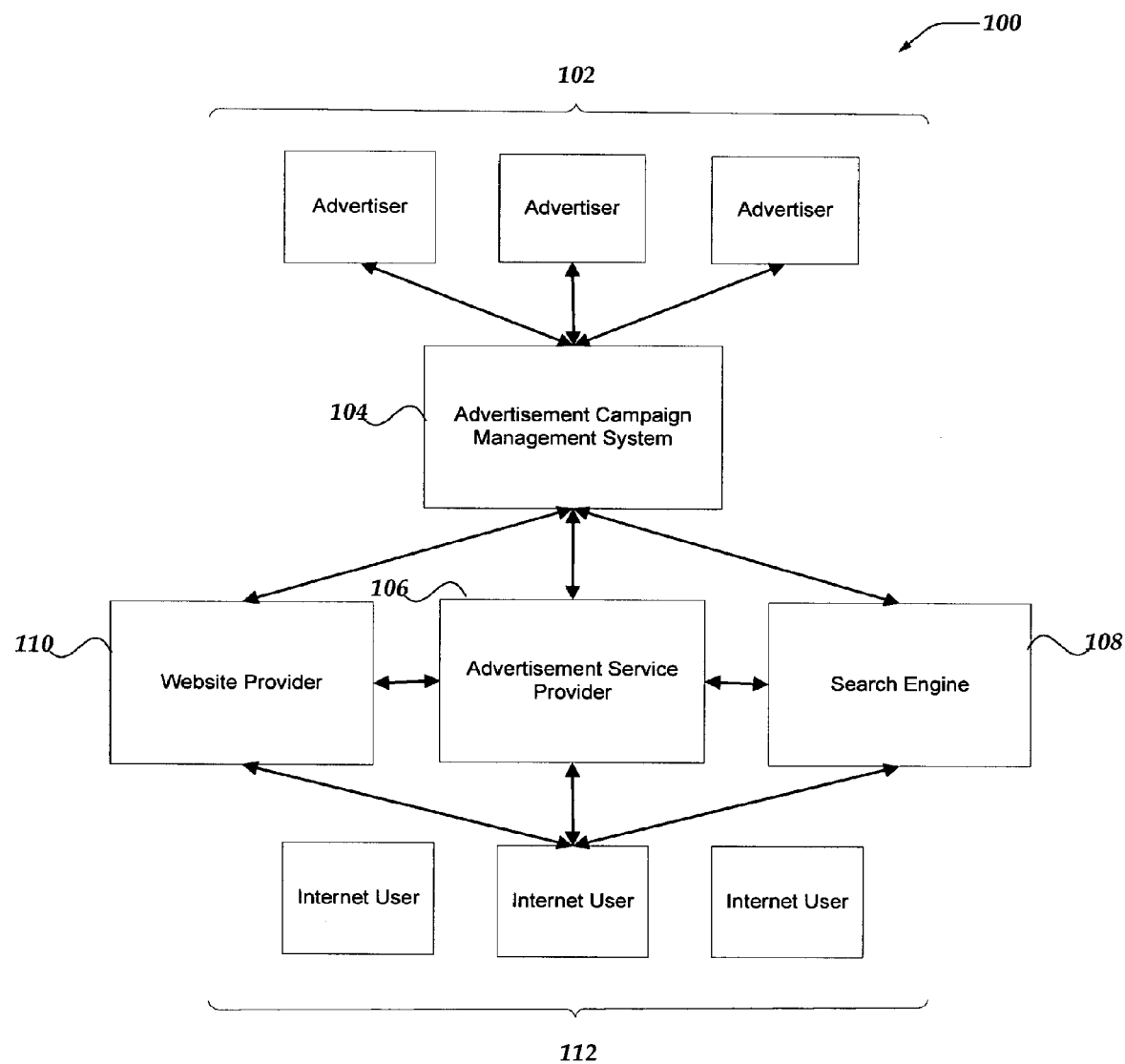
FIG. 1 is a block diagram of one embodiment of an environment in which systems and methods for associating a geographic location with an IP address may operate.

FIG. 1 is a block diagram of one embodiment of an environment in which systems and methods for associating a geographic location with an IP address may operate. However, it should be appreciated that the systems and methods described below are not limited to use with a search engine or pay-for-placement online advertising. The environment 100 includes a plurality of advertisers 102, an ad campaign management system 104, an ad provider 106, a search engine 108, a website provider 110, and a plurality of Internet users 112. Generally, an advertiser 102 bids on terms and creates one or more digital ads by interacting with the ad campaign management system 104 in communication with the ad provider 106. The digital ad may be a graphical banner ad that appears on a website viewed by Internet users 112, a sponsored search listing that is served to an Internet user 112 in response to a search performed at a search engine 108, a video ad, a graphical banner ad based on a sponsored search listing, and/or any other type of online marketing media known in the art.

When an Internet user 112 performs a search at a search engine 108, the search engine 108 typically receives a search query and an IP address associated with the search query. In response to the search query, the search engine 108 returns search results including one or more search listings based on search terms within the search query provided by the Internet user 112. Additionally, the ad provider 106 may serve one or more digital ads created using the digital ad campaign management system 104 to the Internet user 112 based on search terms within the search query provided by the Internet user 112.

Similarly, when an Internet user 112 requests a website served by the website provider 110, the ad provider 106 receives a digital ad request. The digital ad request may include data such as keywords obtained from content of the website and an IP address. In response to the digital ad request, the ad provider 106 serves one or more digital ads created using the ad campaign management system 104 to the Internet user 112 based on the keywords within the digital ad request.

When the search engine 108 serves search listings, or the digital ad provider 106 serves digital ads, the search engine 108, the ad campaign management system 104, and/or the ad provider 106 typically record and process information associated with the served search listings or digital ads. For example, the search engine 108, the ad campaign management system 104, and/or the ad provider 106 may record the search terms that caused the search engine 108 to serve the search listings; the search terms that caused the ad provider 106 to serve the digital ads; whether the Internet user 112 clicked on a URL associated with a served search listing or a served digital ad; what search listings or digital ads the search engine 108 and/or the ad provider 106 served with each search listings or digital ad; a rank or position of a digital ad when the Internet user 112 clicked on the digital ad; and/or for each search listing or digital ad, whether an Internet user 112 clicked on a different search listing or digital ad served at the same time. One example of an ad campaign management system that may perform these types of actions is disclosed in U.S. patent application Ser. No. 11/413,514, filed Apr. 28, 2006, and assigned to Yahoo! Inc.

Figure 9:
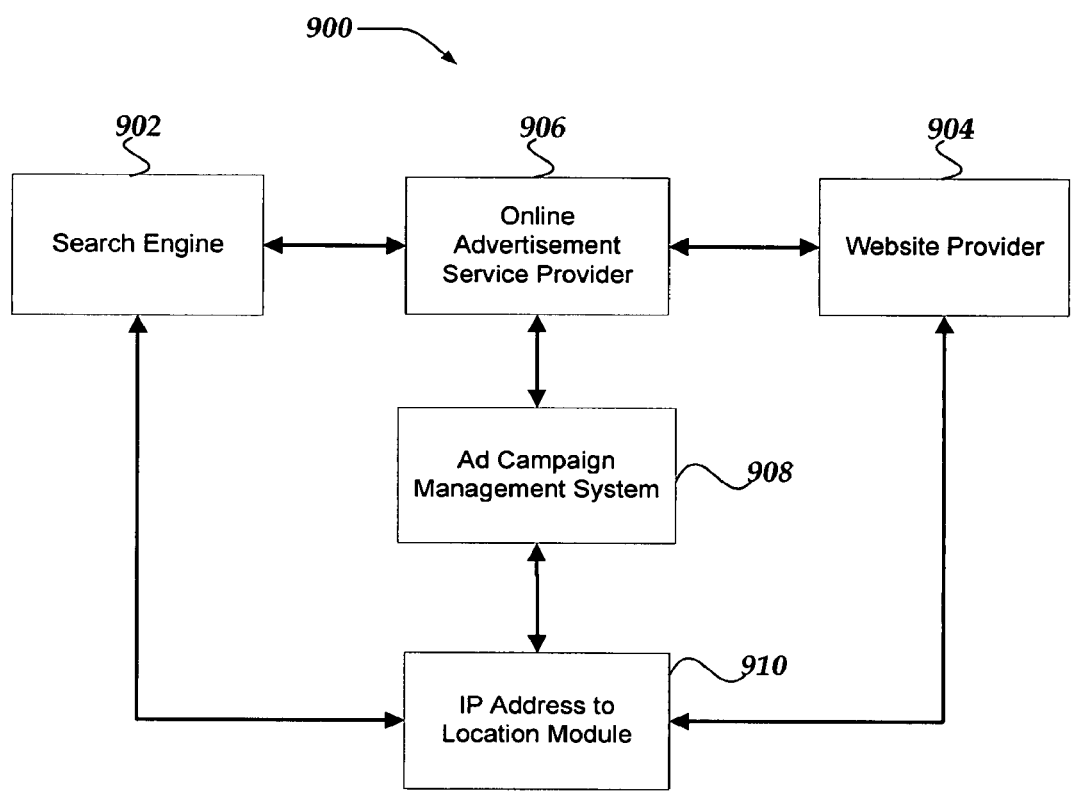
FIG. 9 is a is a block diagram of one embodiment of a system for associating a geographic location with an IP address based on user activity associated with browser cookies.
Figure 10:
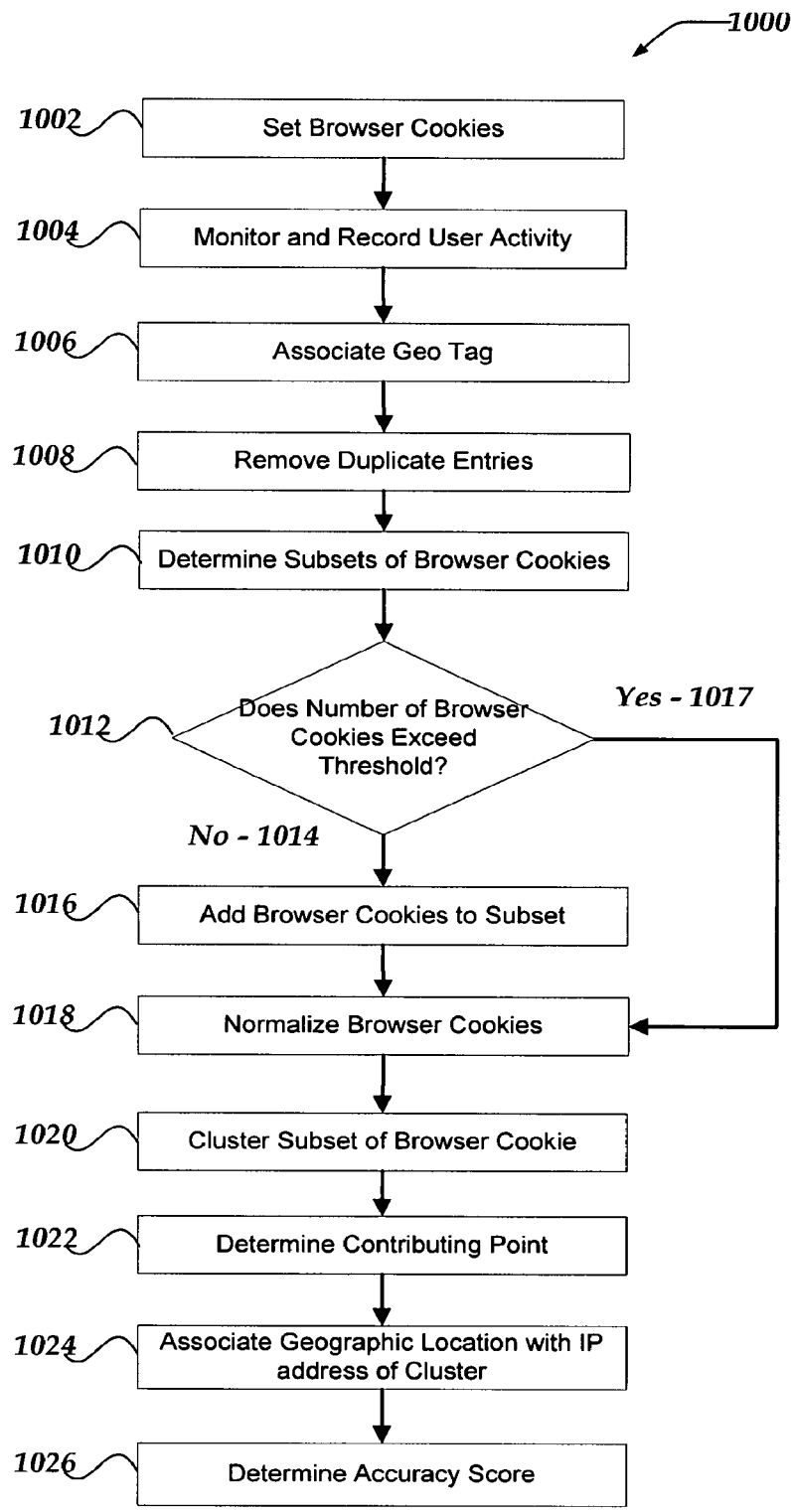
FIG. 10 is a flow chart of one embodiment of a method for associating a geographic location with an IP address based on user activity associated with browser cookies.
Figure 11:
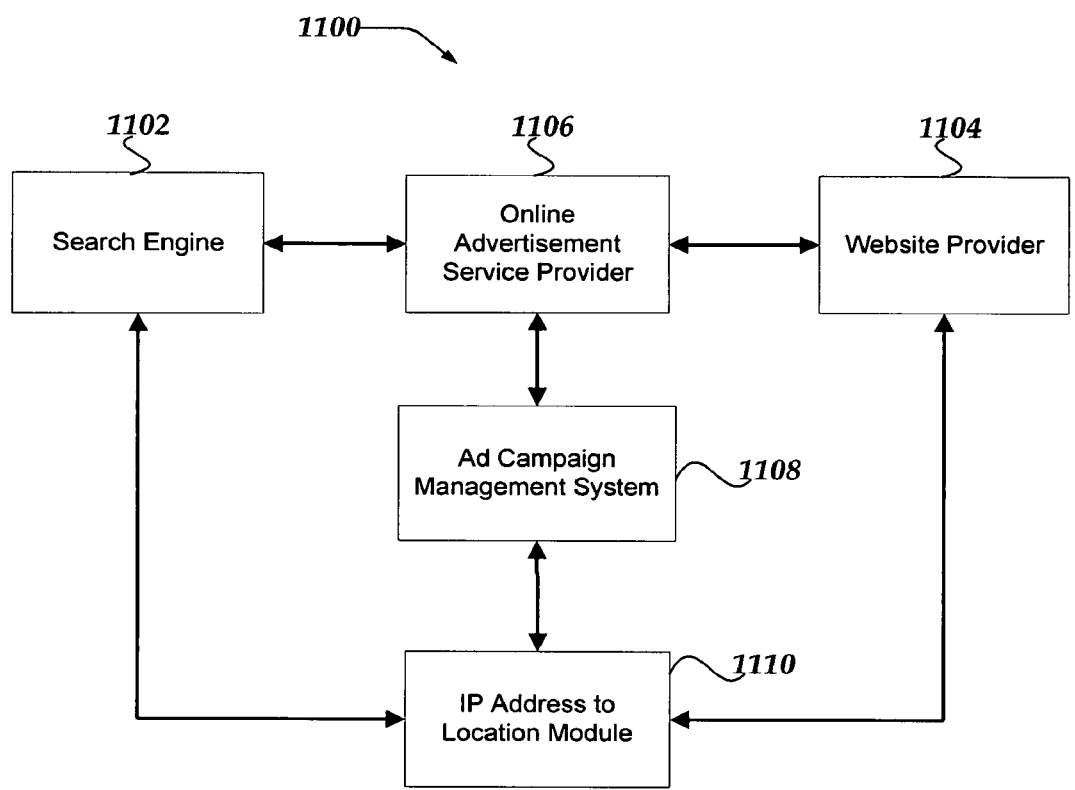
FIG. 11 is a block diagram of one embodiment of a system for associating a geographic location with an IP address based on a local intent of search queries received at a search engine.
Figure 12:
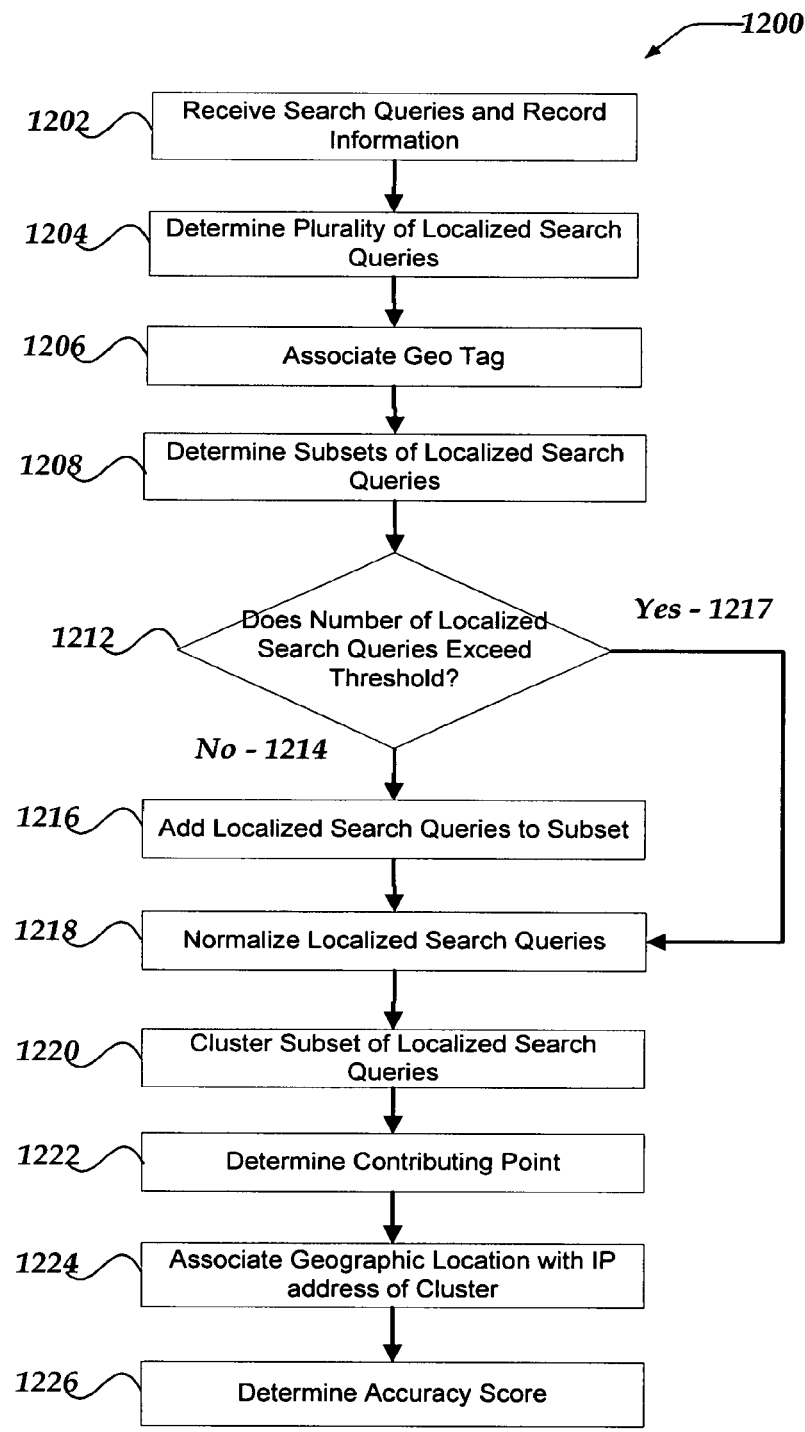
FIG. 12 is a flow chart of one embodiment of a method for associating a geographic location with an IP address based on a local intent of search queries received at a search engine.

In processing information associated with served search listings or digitals ads, the search engine 108, the ad campaign management system 104, the ad provider 106, and/or another module of the search engine 108 or the ad provider 106 may associate a geographic location with an IP address based on IP addresses received with search queries or digital ad requests. The description below describes at least three different systems and methods for associating a geographic location with an IP address. Generally, FIGS. 2-8 illustrate systems and methods for associating a geographic location with an IP address based on user activity associated with registered users. FIGS. 9 and 10 illustrate systems and methods for associating a geographic location with an IP address based on user activity associated with browser cookies. FIGS. 11 and 12 illustrate systems and methods for associating a geographic location with an IP address based on a local intent of search queries received at a search engine.

Figure 2:
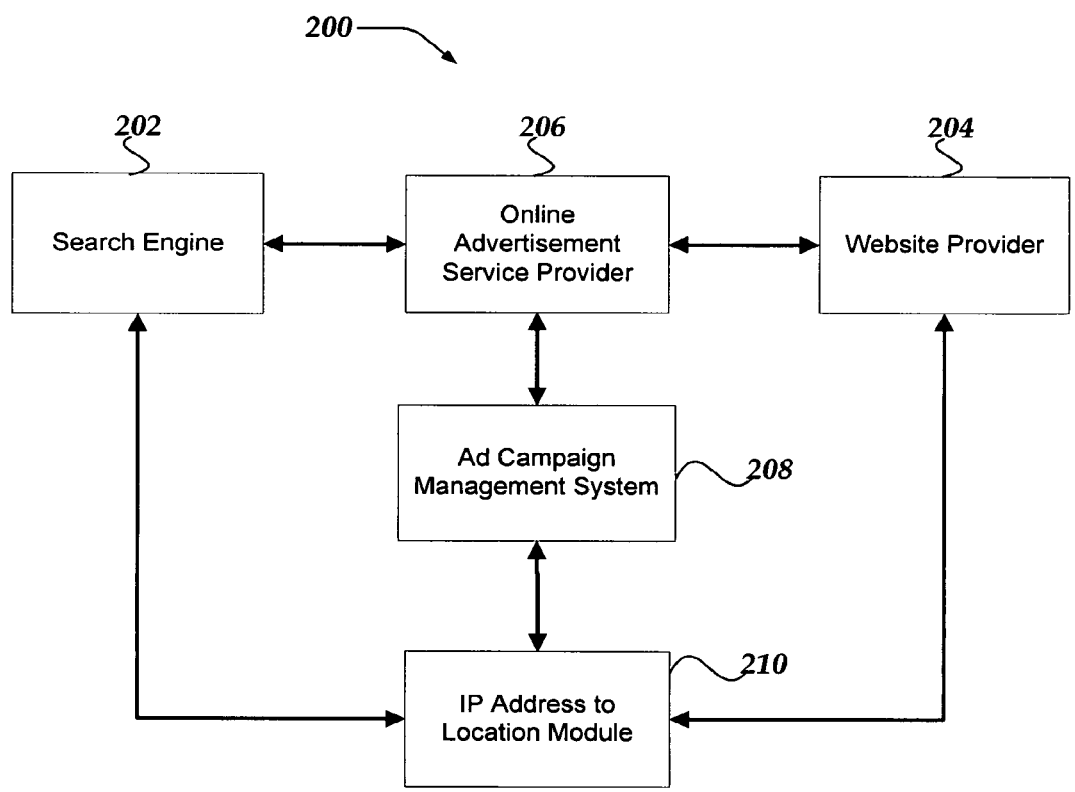
FIG. 2 is a block diagram of one embodiment of a system for associating a geographic location with an IP address based on user activity associated with registered users.

FIG. 2 is a block diagram of one embodiment of a system for associating a geographic location with an IP address based on user activity associated with registered users. Generally, the system 200 includes a search engine 202, a website provider 204, an ad provider 206, an ad campaign management system 208, and an IP address to location module 210. In some implementations the IP address to location module 210 may be part of the search engine 202 and/or the ad provider 206. However, in other implementations, the IP address to location module 210 is distinct from the search engine 202 and/or the ad provider 206. Typically the search engine 202, website provider 204, ad provider 206, ad campaign management system 208, and IP address to location module 210 communicate with one another over one or more external or internal networks. The search engine 202, website provider 204, ad provider 206, ad campaign management system 208, and IP address to location module 210 may be implemented as software code stored on a computer-readable storage medium and running in conjunction with a processor such as a personal computer, a single server, a plurality of servers, or any other type of computing device known in the art.

Search engines 202 and website providers 204 often provide the opportunity for a user to register with the search engine 202 and/or website provider 204. Typically, as part of the process for registering with the search engine 202 and/or website provider 204, a user will provide demographic information such as the user's gender, age, occupation, income level, home address, and/or business address. To encourage a user to register, search engines 202 and/or website providers 204 may provide the user with access to a free email account, special advertisements or discounts available only to registered users, access to restricted webpages available only to registered users, or any other incentive a search engine 202 and/or website provider 204 may desire to provide to registered users. When a user is registered, the search engine 202 and/or website provider 204 provide the registered user with a unique identifier which allows the search engine 202 and/or website provider 204 to monitor and record the activity of the registered user. For example, the search engine 202 and/or website provider 204 may monitor the types of search queries submitted by the registered user, the webpages the registered user visits, what products and services the registered user purchases, or any other user activity on the Internet that may be useful to the search engine 202 and/or website provider 204.

In addition to the information recited above, the search engine 202 and/or website provider 204 may monitor and record IP addresses associated with the activity of registered users. The IP address to location module 210 processes the recorded user activity and the IP address associated with the activity of the registered user for a plurality of registered users to associate a geographic location with an IP address.

Figure 3:
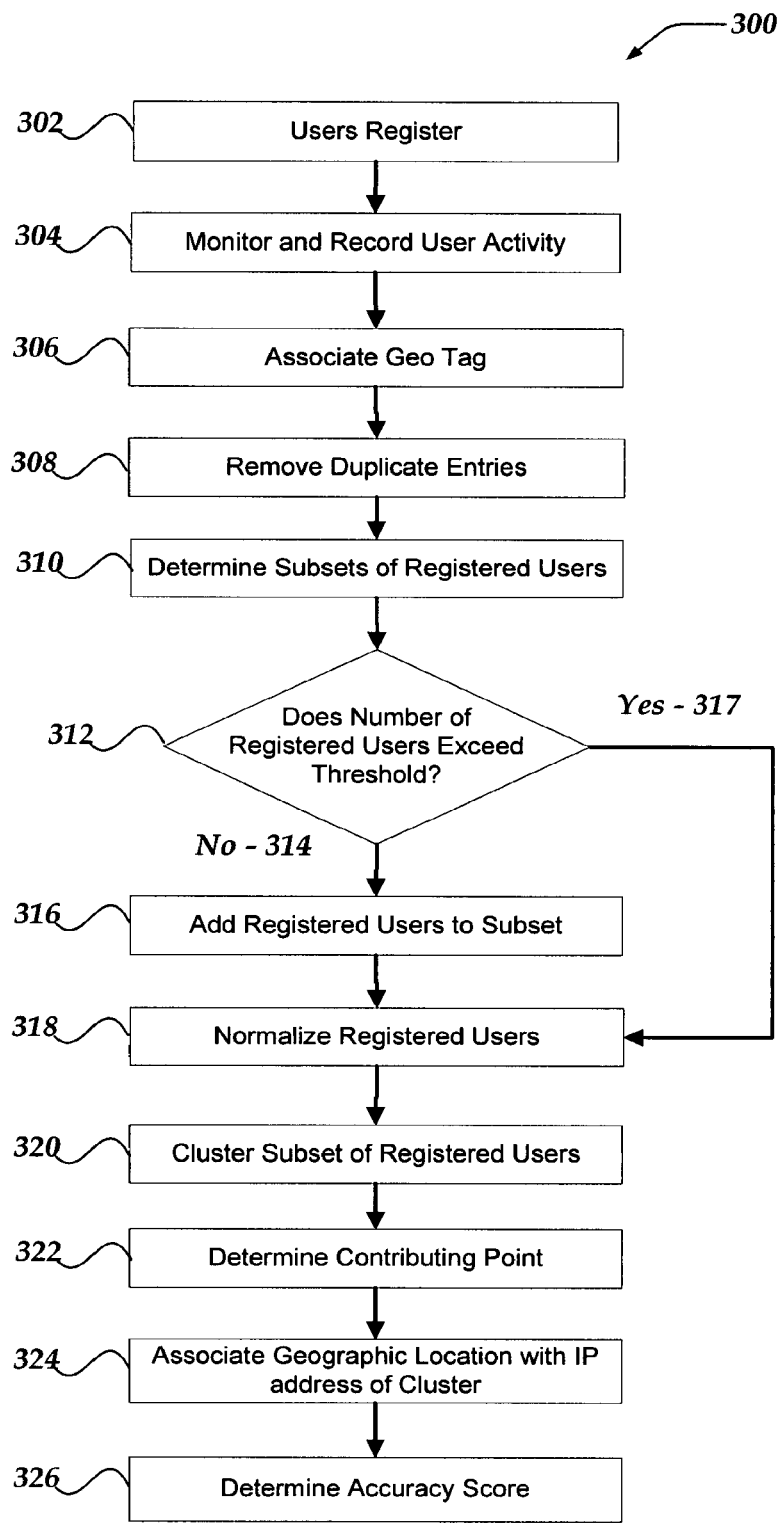
FIG. 3 is a flow chart of one embodiment of a method for associating a geographic location with an IP address based on user activity associated with registered users.

FIG. 3 is a flow chart of one embodiment of a method for associating a geographic location with an IP address based on user activity associated with registered users. The method 300 begins with a plurality of users interacting with a search engine and/or a website provider to register with the search engine or website site provider at step 302. As described above, the users provide demographic information when registering such as a home address of the user. The search engine and/or website provider monitor and record the user activity of the plurality of registered users at step 304. For example, the search engine and/or website provider may monitor and record the types of search queries submitted by each registered user, the webpages each registered user visits, the products and service each registered user purchases, and the IP address associated with each registered user. In one implementation, the search engine and/or website provider record the user activity in search logs.

Systems such as an IP address to location module associate a geo tag with each of the registered users at step 306 based on the location of the user provided during registration. Generally, a geo tag may be an identifier assigning a longitude and latitude coordinate to a geographic location such as a home address or a business address associated with the registered user. Examples of systems and methods for indexing data such as associating a geo tag with a geographic location associated with a user are disclosed in U.S. patent application Ser. No. 10/982,629, filed Nov. 4, 2004 and assigned to Yahoo! Inc., the entirety of which is hereby incorporated by reference.

In some implementations, the IP address to location module reviews records associated with the plurality of registered users to remove any duplicate entries for one user having multiple registered accounts at step 308. After removing any duplicate entries, the IP address to location modules identifies one or more subsets of the plurality of registered users at step 310. Each subset of the plurality of registered users is associated with the same IP address, or a defined range of IP addresses.

The IP address to location module examines a subset of the plurality of registered users to determine a geographic location associated with the IP address, or defined range of IP addresses, of the subset. Initially, the IP address to location module may examine the number of registered users in the subset to determine if the number of registered users in the subset exceeds a quorum threshold at step 312. The quorum threshold is a number of registered users that should be present in the subset to accurately associate a geographic location with an IP address. In one implementation, the quorum threshold may be set at 50 registered users, but the quorum threshold may be set at any number of users.

If the IP address to location module determines that the number of registered users in the subset does not exceed the quorum threshold (314), the IP address to location module may add registered users to the subset that are associated with an adjoining IP address at step 316 so that the number of registered users in the subset exceeds the quorum threshold. Typically an IP address adjoins another IP address when it is the numerically closest IP address within the same Class-C subnet as the original IP address. As known in the art, a Class-C subnet is an IP address block consisting of 256 consecutive addresses. In some implementations, any registered users added to the subset must be associated with an IP address that is in the same Class-C subnet as the original IP address because different Class-C IP addresses have a high risk of being routed differently.

In some implementations, the IP address to location module may limit the number of registered users added to the subset to a predefined ceiling. For example, the number of registered users added to a subset may not be more than 25% of the total number of registered users in the subset.

If the IP address to location module determines the number of registered users in the subset exceeds the quorum threshold (317), or after adding registered users to the subset so that the number of registered users in the subset exceeds the quorum threshold at step 316, the method proceeds to step 318. In some implementations, the IP address to location module may normalize a weight associated with registered users at step 318. Normalizing a weight associated with registered users allows the IP address to location module to adjust the weight of each registered user in determining a geographic location associated with an IP address based on factors such as a population of a geographic location associated with a registered user. If the weight associated with registered users is not normalized, it is likely that a geographic location associated with an IP address will regularly be biased towards a geographic location with a high population density, such as a large city. To address this issue, the IP address to location module may normalize a weight associated with each registered user so that registered users located in a highly populated area have less weight in determining a geographic location associated with an IP address than registered users located in sparsely populated areas. However, in other implementations, the IP address to location module does not normalize a weight associated with the registered users so that each user has the same weight in determining a geographic location associated with the IP address.

The IP address to location module creates a spatial cluster for the subset at step 320. In one implementation, the IP address to location module creates a spatial cluster for the subset based on registered users of the subset that have a geo tag located within a predefined distance of a geo tag of another registered user of the cluster. In one implementation, the predefined distance may be 30 miles. However, any predefined distance may be used. The IP to location module may set the predefined distance based on factors such as a granularity of user data available, e.g. a street address or zipcode associated with a registered user; a population density association with a geographic location associated with a registered user; adjacency relationships, such as those described in U.S. patent application Ser. No. 10/982,629, relating to distances between adjacent zip codes; or any other factor desired by the IP to location module. In other implementations, other algorithms for creating spatial clusters known in the art may be used.

Figure 4:
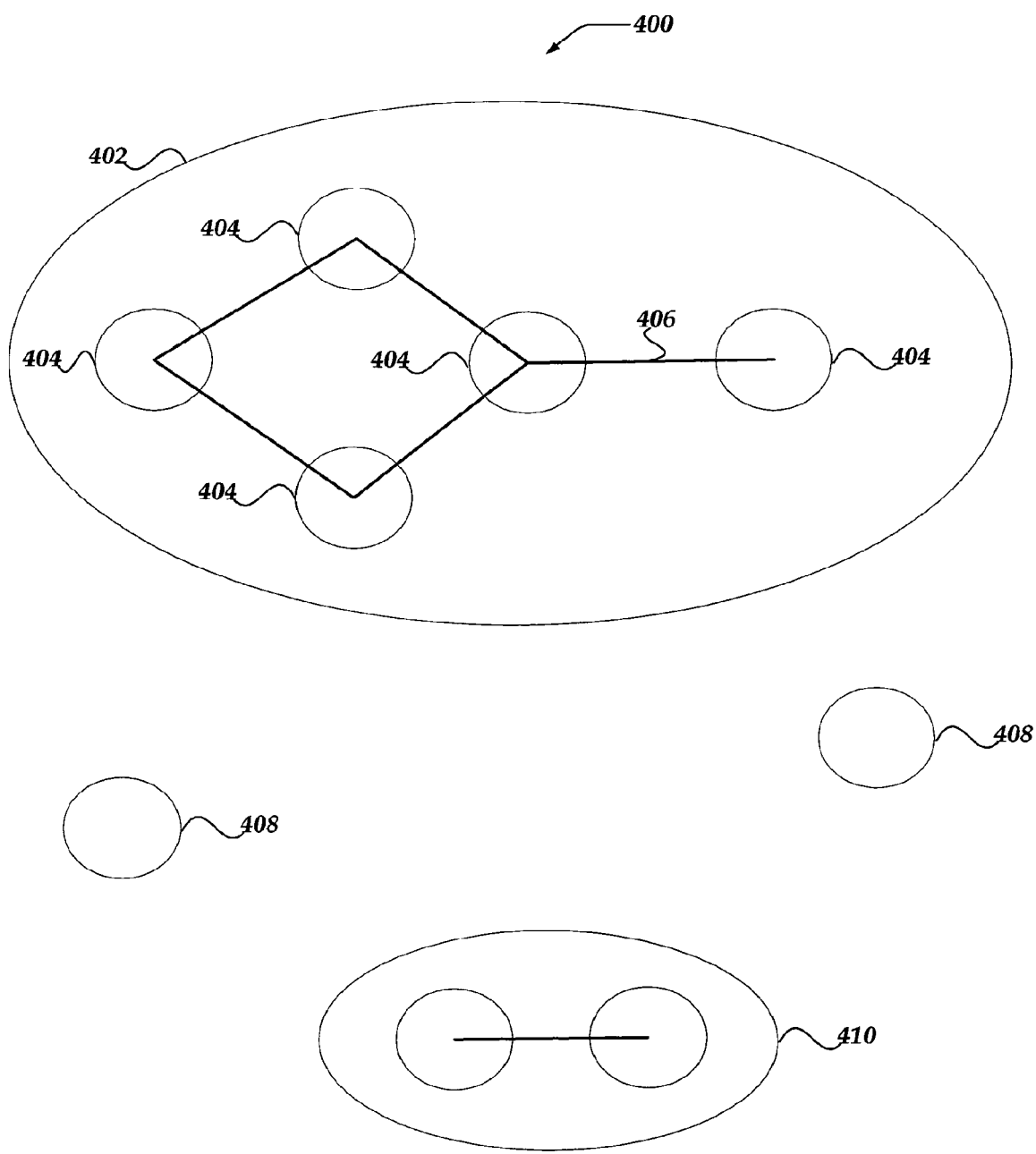
FIG. 4 is a diagram illustrating the creation of a spatial cluster.

FIG. 4 is a diagram illustrating how an IP address to location module may create a spatial cluster for one subset. The spatial cluster is created to determine a general location with the most number of registered users within a defined distance of one another that are associated with the same IP address, or defined range of IP addresses. The IP address to location module creates a spatial cluster 402 including a plurality of registered user 404 that are associated with a geo tag located within a predefined distance 406 of a geo tag of another registered user of the cluster. It will be appreciated that the IP address to location module does not include registered users 408 that are not within the predefined distance 406. Additionally, the IP address to location module does not include minor clusters 410. Generally, Minor clusters 410 include fewer registered users than the spatial cluster 402, and include registered users that are associated with a geo tag that is located within a predefined distance of a geo tag of another registered user of the minor cluster 410 but that is not located within a predefined distance of a geo tag of a registered user of the spatial cluster 410.

Referring again to FIG. 3, after the IP address to location module creates a spatial cluster for the subset at step 320, the IP address to location module determines a contributing point near the geographic center of the cluster at step 322. In one implementation, the IP address to location module determines a contributing point by determining a geographic location, such as a longitude and latitude, that is associated with more registered users of the cluster than any other geographic location. However, when two or more geographic locations are equally associated with more registered users of the cluster than any other geographic location, the IP address to location module determines a contributing point to be the geographic location that is closest to the average of all of the geographic locations associated with registered users of the cluster, For example, with respect to longitude and latitude coordinates, the IP address to location module would determine the contributing point to be the geographic location associated with a registered user of the cluster that is closest to the average longitude and latitude of all of the longitudes and latitudes associated with registered users of the cluster.

The IP address to location module assigns a geographic location associated with the determined geographic center of the cluster (the contributing point) to the IP address, or defined range of IP addresses, shared by the registered users of the cluster at step 324. The geographic location associated with the geographic center of the cluster may be a street, a zip code, a neighborhood, a city, a state, a DMA, or any other geographic location. For example, if all registered users of a cluster are associated with a single IP address, the IP location module may assign a zip code associated with the determined geographic center of the cluster (the contributing point) with the single IP address. Similarly, if all registered users of a cluster are associated with one of two sequential IP addresses, the IP location module may assign a zip code associated with the determined geographic center of the cluster (the contributing point) with the two sequential IP addresses.

The IP address to location module may determine an accuracy score at step 326 for the association of the geographic location with the IP address, or defined range of IP addresses, shared by the registered users of the cluster at step 324. The IP address to location module may determine the accuracy score on a street level, a zip code level, a city level, a DMA level, a state level, a country level, or any other geographic level desired by a search engine and/or web provider.

Figure 5:
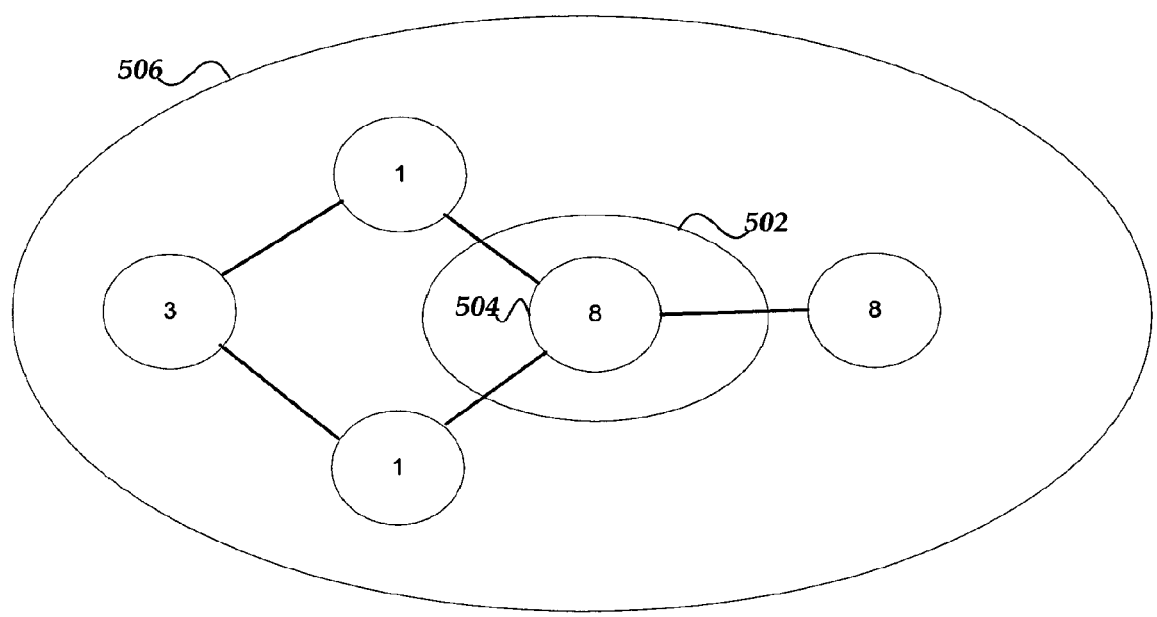
FIG. 5 is a diagram illustrating one method for determining an accuracy score at a zip code level of an association of a geographic location with an IP address.

FIG. 5 is a diagram illustrating one method for determining an accuracy score on a zip code level of an association of a geographic location associated with the determined geographic center of a cluster (the contributing point) with the IP address, or defined range of IP addresses, shared by the registered users of the cluster. Generally, an accuracy score on a zip code level is determined by dividing a total number of registered users of the cluster in a zip code 502 that is also the zip code associated with the determined geographic center 504 of the cluster 506 by the total number of registered users in the cluster 506.

In FIG. 5, eight registered users of the cluster are in the zip code 502 that is also the zip code associated with the determined geographic center 504 of the cluster 506. Further, there is a total of twenty-one registered users in the cluster 506. Therefore, the accuracy score is determined by dividing eight by twenty-one. Accordingly, the accuracy score on a zip code level of the geographic location associated with the IP address, or defined range of IP addresses, shared by the registered users of the cluster 506 is 38.1%.

Figure 6:
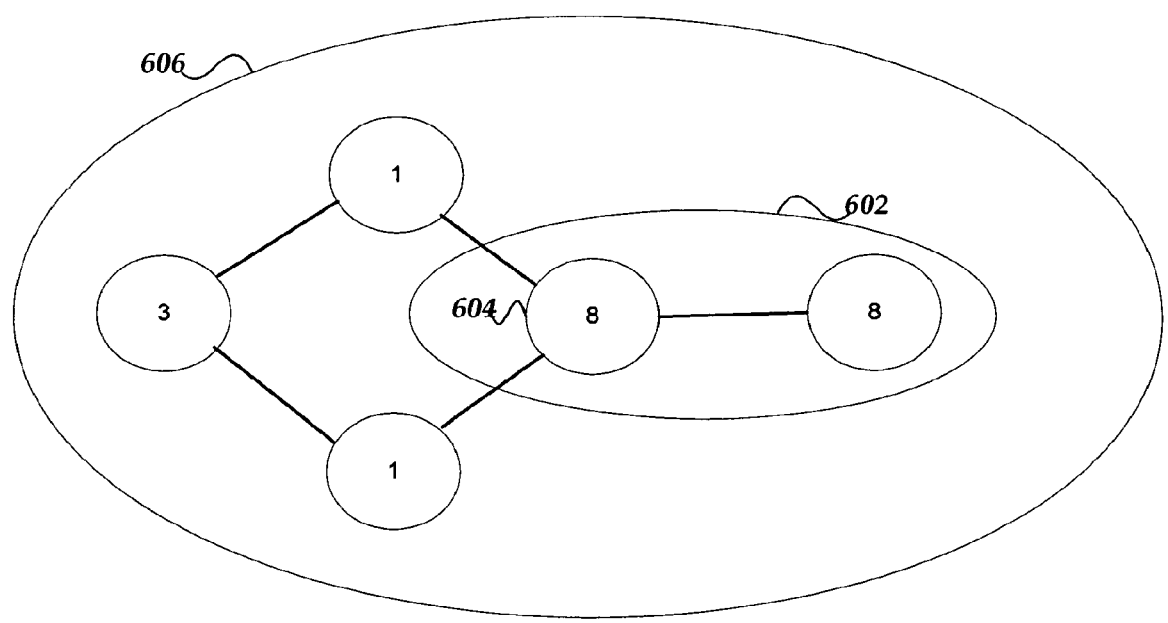
FIG. 6 is a diagram illustrating one method for determining an accuracy score at a city level of an association of a geographic location with an IP address.

FIG. 6 is a diagram illustrating one method for determining an accuracy score on a city level of an association of a geographic location associated with the determined geographic center of the a cluster (the contributing point) with the IP address, or defined range of IP addresses, shared by the registered users of the cluster. Generally, an accuracy score on a city level is determined by dividing a total number of registered users of the cluster in a city 602 that is also the city associated with the determined geographic center 604 of the cluster 606 by the total number of registered users in the cluster 606.

In FIG. 6, sixteen registered users of the cluster are in the city 602 that is also the city associated with the determined geographic center 604 of the cluster 606. Further, there is a total of twenty-one registered users in the cluster 606. Therefore, the accuracy score is determined by dividing sixteen by twenty-one. Accordingly, the accuracy score on a city level of the geographic location associated with the IP address, or defined range of IP addresses, shared by the resisted users of the cluster 606 is 76.2%

Figure 7:
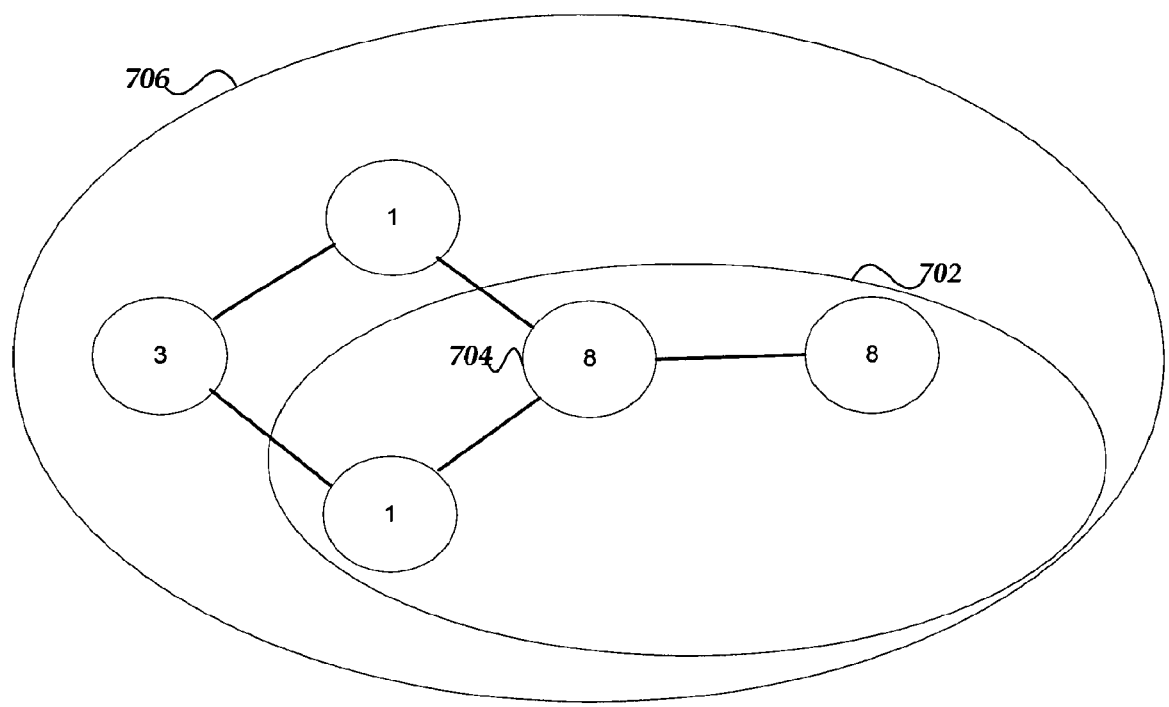
FIG. 7 is a diagram illustrating one method for determining an accuracy score at a designated market area ("DMA") level of an association of a geographic location with an IP address.

FIG. 7 is a diagram illustrating one method for determining an accuracy score on a DMA level of an association of a geographic location associated with the determined geographic center of a cluster (the contributing point) with the IP address, or defined range of IP addresses, shared by the registered users of the cluster. Generally, an accuracy score on a DMA level is determined by dividing a total number of registered users of the cluster in a DMA 702 that is also the DMA associated with the determined geographic center 704 of the cluster 706 by the total number of registered users in the cluster 706.

In FIG. 7, seventeen registered users of the cluster are in the DMA that is also the DMA associated with the determined geographic center 704 of the cluster 706. Further, there is a total of twenty-one registered users in the cluster 706. Therefore, the accuracy score is determined by dividing seventeen by twenty-one. Accordingly, the accuracy score on a DMA level of the geographic location associated with the IP address, or defined range of IP addresses, shared by the registered users of the cluster 706 is 80.9%.

Figure 8:
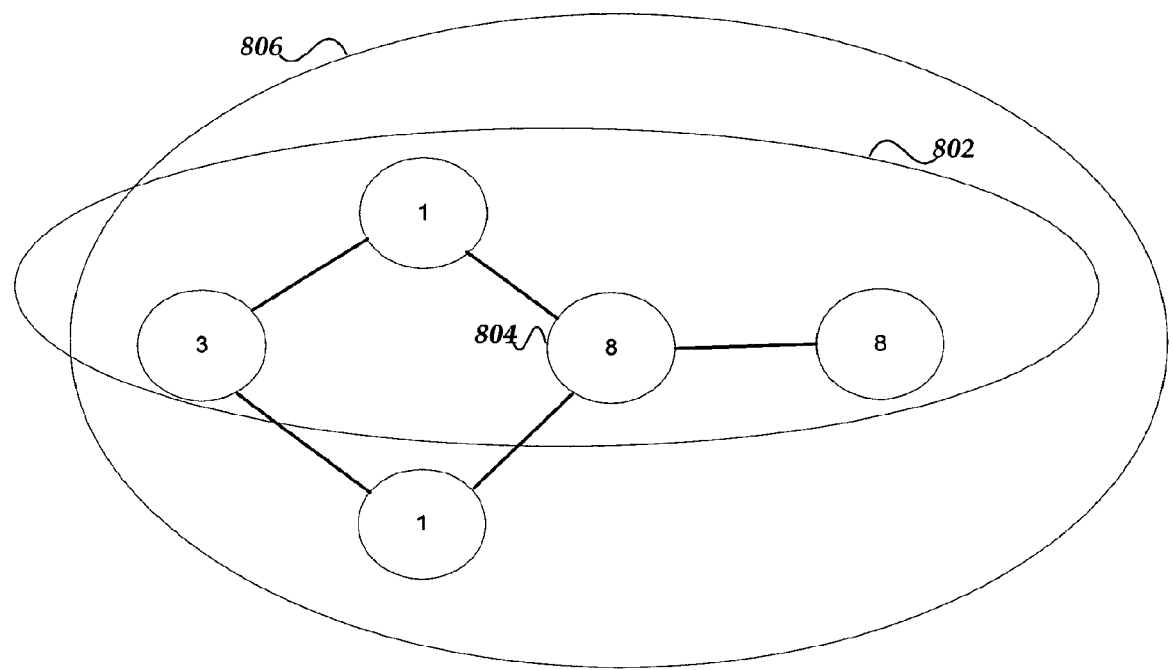
FIG. 8 is a diagram illustrating one method for determining an accuracy score at a state level of an association of a geographic location with an IP address.

FIG. 8 is a diagram illustrating one method for determining an accuracy score on a state level of an association of a geographic location associated with the determined geographic center of a cluster (the contributing point) with the IP address, or defined range of IP addresses, shared by the registered users of the cluster. Generally, an accuracy score on a state level is determined by dividing a total number of registered users of the cluster in a state 802 that is also the state associated with the determined geographic center 804 of the cluster 806 by the total number of registered users in the cluster 806.

In FIG. 8, twenty registered users of the cluster are in the state that is also the state associated with the determined geographic center 804 of the cluster 806. Further, there is a total of twenty-one registered users in the cluster 806. Therefore, the accuracy score is determined by dividing twenty by twenty-one. Accordingly, the accuracy score on a state level of the geographic location associated with the IP address, or defined range of IP addresses, shared by the registered users of the cluster 806 is 95.2%.

In addition to associating a geographic location with an IP address based on user activity associated with registered users, a geographic location may be associated with an IP address based on user activity associated with browser cookies. FIG. 9 is a block diagram of one embodiment of a system for associating a geographic location with an IP address based on user activity associated with browser cookies. Similar to the system 200 of FIG. 2, the system 900 includes a search engine 902, a website provider 904, an ad provider 906, an ad campaign management system 908, and an IP address to location module 910.

A browser cookie is typically a small text file that a website provider 904 serves to a user. The browser cookie is stored locally by the user and is sent to the website provider 904 whenever the user requests a subsequent webpage from the website provider 904. One use of browser cookies is to set a geographic location for a user with a webpage such as a webpage that provides local weather to a user or a webpage that provides local telephone listings to a user. Therefore, when a user returns to the webpage, the user is automatically provided with local weather, or the user may search for local telephone listings without having to again identify a geographic location of the user.

The search engine 902 and/or website provider 904 may receive one or more browser cookies when a user submits a search query or requests a webpage. The search engine 902, the website provider 904, and/or the ad provider 906 may monitor and record user activity associated with received browser cookies. For example, for each browser cookies received, the search engine 902, the website provider 904, and/or the ad provider 906 may record webpage requests or search requests received with a browser cookie, search listings or digital ads served to a user in response to a request with a browser cookie, which search listings or digital ads a user clicks on after sending a request with a browser cookie, or any other activity associated with a browser cookie desired by the search engine 902, the website provider 904, and/or the ad provider 906. Similarly, the search engine 902, the website provider 904, and/or the ad provider 906 may monitor and record IP addresses associated with received browser cookies.

The IP address to location module 910 processes the recorded user activity and IP addresses associated with the received browser cookies to associate a geographic location with an IP address. FIG. 10 is a flow chart of one embodiment of a method for associating a geographic location with an IP address based on user activity associated with browser cookies. The method 1000 begins with a plurality of users interacting with a search engine and/or a website provider which results in a browser cookie being set with the user that identifies a geographic location such as a home address or a business address of a user at step 1002. The search engine, website provider, and/or ad provider monitor and record activity associated with the plurality of browser cookies and associated users at step 1004. For example, the search engine and/or website provider may monitor and record the types of search queries associated with a browser cookies, viewed webpages associated with a browser cookie, purchased products and service associated with a browser cookie, and an IP address associated with a browser cookie. In one implementation, the search engine, website provider, and/or ad provider records activity associated with browser cookies in search logs.

An IP address to location module associates a geo tag with each of the browser cookies and associated users at step 1006 based on the geographic location, such as the home address or business address, identified in the browser cookie. Generally, a geo tag may be an identifier assigning a longitude and latitude coordinate to a geographic location such as a home address or business address with a browser cookie. One example of systems and methods for indexing data such as associating a geo tag with a geographic location such as a home address or business address identified in a browser cookie is disclosed in U.S. patent application Ser. No. 10/982,629, filed Nov. 4, 2004, and assigned to Yahoo! Inc.

In some implementations, the IP address to location module reviews records associated with the plurality of browser cookies and associated users to remove any duplicate entries for multiple browser cookies associated with the same user at step 1008. After removing any duplicate entries, the IP address to location modules identifies one or more subsets of the plurality of browser cookies and associated users at step 1010. Each subset of the plurality of browser cookies and associated users is associated with the same IP address, or a defined range of IP addresses.

The IP address to location module examines a subset of the plurality of browser cookies and associated users to determine a geographic location associated with the IP address, or defined range of IP addresses, of the subset. Initially, the IP address to location module may examine the number of browser cookies and associated users in the subset to determine if the number of browser cookies and associated users in the subset exceeds a quorum threshold at step 1012.

If the IP address to location module determines the number of browser cookies and associated users in the subset does not exceed the quorum threshold (1014), the IP address to location module may add browser cookies and associated users to the subset that are associated with an adjoining IP address at step 1016 so that the number of browser cookies and associated users in the subset exceeds the quorum threshold.

If the IP address to location module determines the number of browser cookies and associated users in the subset exceeds the quorum threshold (1017), or after adding browser cookies and associated users to the subset so that the number of browser cookies and associated users in the subset exceeds the quorum threshold at step 1016, the method proceeds to step 1018. In some implementations, the IP address to location module may normalize a weight associated with browser cookies and associated users at step 1018. As discussed above, normalizing a weight associated with browser cookies allows the IP address to location module to adjust the weight of each browser cookie in determining a geographic location associated with an IP address based on factors such as the population density of a geographic location associated with a browser cookie. If the weight associated with the browser cookies is not normalized, it is likely that a geographic location associated with an IP address will regularly be biased towards a geographic location with a high population density, such as a large city. To address this issue, an IP address to location module may normalize a weight associated with a browser cookies so that users submitting browser cookies that are located in a highly populated area have less weight in determining a geographic location associated with an IP address than users submitting browser cookies that are located in sparsely populated areas. However, in other implementations, the IP address to location module does not normalize a weight associated with browser cookies and associated uses so that each browser cookie and associated user has an equal weight in determining a geographic location associated with an IP address.

The IP address to location module creates a spatial cluster for a subset at step 1020 as described above with respect to FIGS. 3 and 4. In one implementation, the IP address to location module creates a spatial cluster by associating all browser cookies and associated users with geo tags that are located within a predefined distance of a geo tag of another browser cookies and associated user of the cluster. However, other algorithms for creating spatial clusters known in the art may be used.

After the IP address to location module creates a spatial cluster for the subset, the IP address to location module determines a contributing point near the geographic center of the cluster at step 1022. The IP address to location module then associates a geographic location of the determined geographic center of the cluster (the contributing point) with the IP address, or defined range of IP addresses, shared by the browser cookies and associated users of the cluster at step 1024. The geographic location associated with the geographic center of the cluster may be a street, a zip code, a neighborhood, a city, a state, a DMA, or any other geographic location. For example, if all browser cookies and associated users of a cluster are associated with a single IP address, the IP location module may associate a zip code associated with the determined geographic center of the cluster (the contributing point) with the single IP address. Similarly, if all browser cookies and associated users of a cluster are associated with one of two sequential IP addresses, the IP location module may associate a zip code associated with the determined geographic center of the cluster (the contributing point) with the two sequential IP addresses.

The IP address to location module may determine an accuracy score at step 1026 of the geographic location associated with the IP address, or defined range of IP addresses, shared by the browser cookies and associated users of the cluster at step 1024. Similar to that described above with respect to FIGS. 5-8, the IP address to location module may determine the accuracy score on a street level, a zip code level, a city level, a DMA level, a state level, a country level, or any other geographic level desired by a search engine and/or web provider.

In addition to associating a geographic location with an IP address based on user activity associated with registered users or user activity associated with browser cookies, a geographic location may be associated with an IP address based on a local intent of search queries received at a search engine. FIG. 11 is a block diagram of one embodiment of a system for associating a geographic location with an IP address based on a local intent of search queries received at a search engine. Similar to the systems 200, 900 of FIGS. 2 and 9, the system 1100 includes a search engine 1102, a website provider 1104, an ad provider 1106, an ad campaign management system 1108, and an IP address to location module 1110.

A local intent of a search query indicates a degree of confidence that a user submitting the search query desires search results relating to the location of the user. For example, a search query "Dentist Pasadena" has a high local intent because a user submitting the search query is likely located in or near Pasadena, Calif. and searching for a local dentist. It will be appreciated that for a search query to have a high local intent, it is not necessary for the search query to include an explicit location. For example, a search query of "Dentist" has a higher local intent than a search query of "Holiday" because a user submitting the search query "Dentist" is more likely to require a local dentist than a user submitting the search query "Holiday" requiring a local holiday.

As the search engine 1102 receives search queries from a plurality of users, the search engine 1102 determines a local intent of the search queries and records information such as the search query, a local intent associated with the search query, and an IP address associated with the search query. The IP address to location module 1110 processes the recorded search queries, local intent of each of the search queries, and IP address associated with the received search queries to associate a geographic location with an IP address. FIG. 12 is a flow chart of one embodiment of a method for associating a geographic location with an IP address based on a local intent of search queries received at a search engine.

The method 1200 begins at step 1202 with a search engine receiving a plurality of search queries from users and recording information associated with the received search queries. The IP address to location module determines a plurality of localized search queries of the plurality of receive search queries at step 1204. In one implementation, the IP address to location module determines the plurality of localized search queries based on whether each search query contains an explicit geographic location and a term that is known to have a high degree of local intent.

Examples of systems and methods for identifying whether a search query includes an explicit geographic location are disclosed in U.S. patent application Ser. No. 10/680,495, filed Oct. 7, 2003 and assigned to Yahoo! Inc., the entirety of which is hereby incorporated by reference. Generally, as described in U.S. patent application Ser. No. 10/680,495, to determine an explicit geographic location in a search query, the search query is parsed into text including a name of a geographic location and text that does not include a name of a geographic location. An explicit geographic location associated with the search query is then determined based on factors such as one or more names of geographic locations in the search query; whether for any of the names of geographic locations in the search query, multiple geographic locations exist with the same name; relationships between any of the geographic locations named in the search query; and relationships between the geographic locations named in the search query and the text of the search query that does not include a name of a geographic location.

Examples of systems and methods for determining whether a term has a high degree of local intent are disclosed in U.S. patent application Ser. No. 11/729,103, titled "System for Providing Geographically Relevant Content to a Search Query with Local Intent," U.S. patent application Ser. No. 11/729,104, titled "System for Determining the Geographic Range of Local Intent in a Search Query," and U.S. patent application Ser. No. 11/729,096, titled "System for Determining Local Intent in a Search Query," each of which were filed Mar. 28, 2007, and assigned to Yahoo! Inc., the entirety of each of which is hereby incorporated by reference. Generally, as described in U.S. patent application Ser. Nos. 11/729,103, 11/729,104, and 11/729,096, potentially millions of search queries are examined to establish which terms in search queries tend to be associated with locations that are near a location of a user submitting the search query. For example, if many search queries show that users search for the term "Dentist" in locations near where the users are located, such as a search query "Dentist Pasadena" for a user located in Pasadena, the term "Dentist" is deemed to have a high local intent. Similarly, if many search queries show that users search for the term "Pizza Delivery" in locations near where the users are located, such as a search query "Pizza Delivery Lincoln Park" for a user located in Lincoln Park, the term "Pizza Delivery" is deemed to have a high local intent. Conversely, if many search queries show that users search for the term "Flight" in locations that are not necessarily near locations where users are located, such as a search query "Flight Hawaii" for a user located in Chicago, the term "Flight" is deemed to have a low local intent. In one implementation, a degree of local intent of a term may be assigned a value on a scale of zero to one, with a local term such as "Dentist" assigned a value near one, and a less local term such as "DVD" assigned a value near zero.

After determining the plurality of localized search queries, the IP address to location module associates a geo tag with each of the localized search queries at step 1206. Generally, the IP address to location module associates a longitude and latitude coordinate to the localized search query based on the explicit geographic location in the localized search query. For example, the IP address to location module may associate a longitude and latitude of Pasadena, Calif. for the search query "Dentist Pasadena." Examples of systems and methods for indexing data such as associating a geo tag with an explicit geographic location are disclosed in U.S. patent application Ser. No. 10/982,629, filed Nov. 4, 2004, and assigned to Yahoo! Inc.

The IP address to location module determines one or more subsets of the plurality of localized search queries at step 1208. Each subset of the plurality of localized search queries is associated with the same IP address, or a defined range of IP addresses.

The IP address to location module examines a subset of the plurality of localized search queries to determine if the number of search queries in the subset exceeds a quorum threshold at step 1212. If the IP address to location module determines the number of search queries in the subset does not exceed the quorum threshold (1214), the IP address to location module may add search queries to the subset that are associated with an adjoining IP address at step 1216 so that the number of search queries in the subset exceeds the quorum threshold.

If the IP address to location module determines the number of search queries in the subset exceeds the quorum threshold (1217), or after adding localized search queries to the subset so that the number of localized search queries in the subset exceeds the quorum threshold at step 1216, the method proceeds to step 1218. In some implementations, the IP address to location module may normalize a weight associated with localized search queries at step 1218. As discussed above, an IP address to location module may normalize a weight associated with a localized search query to adjust the weight of the localized search query in determining a geographic location associated with an IP address based on factors such the population density of a geographic location associated with a localized search query. If the weight associated with the localized search query is not normalized, it is likely that a geographic location associated with an IP address will regularly be biased towards a geographic location with a high population density, such as a large city. To address this issue, an IP address to location module may normalize a weight associated with a localized search query at step 1218 so that localized search queries associated with a geographic location that is highly populated will have less weight in determining a geographic location associated with an IP address than search queries associated with a geographic location that is sparsely populated. However, in other implementations, the IP address to location module does not normalize the weight associated with the search queries so that each search query has an equal weight in determining a geographic location associated with an IP address.

The IP address to location module creates a spatial cluster of a subset of the plurality of localized search queries at step 1220 as described above with respect to FIGS. 3 and 4. In one implementation, the IP address to location module creates a spatial cluster by associating all localized search queries of the subset with a geo tag that is located within a predefined distance of a geo tag of another localized search query of the cluster. However, other algorithms for creating spatial clusters know in the art may be used.

After the IP address to location module creates a spatial cluster, the IP address to location module determines a contributing point near the geographic center of the cluster at step 1222. The IP address to location module then associates a geographic location of the determined geographic center of the cluster (the contributing point) with the IP address, or defined range of IP addresses, shared by the localized search queries of the cluster at step 1224. The geographic location associated with the geographic center of the cluster may be a street, a zip code, a neighborhood, a city, a state, a DMA, or any other geographic location. For example, if all localized search queries of a cluster are associated with a single IP address, the IP location module may associate a zip code associated with the determined geographic center of the cluster (the contributing point) with the single IP address. Similarly, if all localized search queries of a cluster are associated with one of two sequential IP addresses, the IP location module may associate a zip code associated with the determined geographic center of the cluster (the contributing point) with the two sequential IP addresses.

The IP address to location module may additionally determine an accuracy score at step 1226 of the geographic location associated with the IP address, or defined range of IP addresses, shared by the localized search queries of the cluster at step 1224. Similar to that described above with respect to FIGS. 5-8, the IP address to location module may determine the accuracy score on a street level, a zip code level, a city level, a DMA level, a state level, a country level, or any geographic level desired by a search engine and/or web provider.

An illustrative example of the above-described method is described below. Table 1 is an example of a set of search queries received at a search engine.

TABLE 1

| IP Address | Search Query | Local Intent |
|---|---|---|
| 217.12.14.240 | *Dentist London* | 0.88 |
| 217.12.14.240 | *Florist West End* | 0.89 |
| 217.12.14.241 | *Park London* | 0.82 |
| 217.12.14.241 | Café New York | 0.79 |
| 217.12.14.242 | *Bar Shaftesbury Ave* | 0.77 |
| 217.12.14.242 | Flight Paris | 0.38 |
| 217.12.14.242 | Flight Hawaii | 0.00 |
| 217.12.14.243 | Visual Basic | 0.00 |
| 217.12.12.243 | Perl Reference | 0.00 |
| 217.12.14.243 | Lost | 0.18 |

In Table 1, six search queries are determined to be highly localized search queries (shown in bold) with an explicit location and a high local intent. When geo tags are associated with the highly localized search queries and the highly localized search queries are clustered as described above, five of the six search queries with explicit locations and a high local intent (shown in bold and italics) refer to London. Accordingly, an IP address to location module can determine there is a high likelihood that the IP address range of 217.12.14.240 to 217.12.14.242 is located in London since the majority of queries having explicit location terms and high local intent non-location terms have similar or same IP addresses.

FIGS. 1-12 disclose systems and methods for associating a geographic location with an IP address based on user activity associated with registered users, user activity associated with browser cookies, and a local intent of search queries received at the search engine. Associating a geographic location with an IP address provides Internet search engine and online advertisement service providers the ability to better target search results and digital ads based on a location of a user.

For example, after associating a geographic location with an IP address, an IP address to location module may export the association to an Internet search engine or an ad provider. Therefore, when the Internet search engine receives a subsequent search query associated with the same IP address, the Internet search engine may determine a location of the user submitting the search query based on the association between the geographic location and the IP address received from the IP address to location model. The Internet search engine may then return search results relating to the search query specifically tailored to the location of the user submitting the search query.

Similarly, when the ad provider receives a digital ad request associated with the same IP address, the ad provider may determine a location of the user that will receive the digital ads based on the association between the geographic location and the IP address received from the IP address to location module. The ad provider may then return digital ads such as sponsored search listings or graphical banner ads tailored to the location of the user receiving the digital ads. For example, the ad provider may serve digital ads relating to products and services actually available near the geographic location of the user receiving the digital ads.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for associating a geographic location with an internet protocol ("IP") address, said method comprising:

obtaining, by a processor, digital request data from content of a webpage associated with a plurality of browser cookies, each of said plurality of browser cookies indicating a geographic location associated with computing devices of a plurality of corresponding users accessing said webpage through a computing device of each respective user;

associating, by said processor, a geo tag with each of said plurality of browser cookies based on said geographic location indicated by said digital request data and a browser cookie of said plurality of browser cookies;

identifying, by said processor, a subset of said plurality of browser cookies, said subset comprising browser cookies associated with said webpage and a first IP address shared by said plurality of browser cookies;

clustering, by said processor, said subset of said plurality of browser cookies into a spatial cluster comprising browser cookies associated with geo tags identifying locations located within a predefined distance of a location indicated by said digital request data and identified in a geo tag of at least one other browser cookie of said spatial cluster;

determining, by said processor, an association between a geographic location associated with a geographic center of said spatial cluster and said first IP address based on a contributing point shared by said plurality of browser cookies near a geographic center of said spatial cluster; and storing, by said processor, in a memory said association between said geographic location associated with said geographic center of said spatial cluster and said first IP address.

2. The method of claim 1, wherein said digital request data comprises digital ad request data.

3. The method of claim 1, wherein said digital request data is further obtained from an IP address based on shared use of said IP address by said computing devices of a plurality of corresponding users.

4. The method of claim 1, and further comprising determining whether a number of said browser cookies in said subset of said plurality of browser cookies exceeds a quorum threshold.

5. The method of claim 4, and further comprising adding one or more browser cookies served to said plurality of users in response to said accessing said webpage to said subset so that said number of said browser cookies in said subset exceeds said quorum threshold.

6. The method of claim 5, wherein said one or more browser cookies are associated with an IP address adjoining said first IP address.

7. The method of claim 1, wherein said contributing point comprises said geographic location that is closest to the average of all of geographic locations associated with said plurality of browser cookies of said spatial cluster.

8. The method of claim 1, wherein said first IP address shared by said plurality of browser cookies comprises a defined range of IP addresses shared by said plurality of browser cookies.

9. The method of claim 1, wherein said determining said association between said geographic location associated with said geographic center of said spatial cluster and said first IP address is based on an accuracy score determined on at least one of the following levels: a street level; a zip code level; a city level; a designated market area level; a state level; or a country level.

10. The method of claim 1, and further comprising serving at least one digital ad to at least one of said plurality of users based on said association between said geographic location associated with said geographic center of said spatial cluster and said first IP address.

11. A non-transitory computer-readable storage medium comprising a set of instructions for associating a geographic location with an Internet Protocol ("IP") address, said set of instructions to direct a processor to:

obtain, by said processor, digital request data from content of a webpage associated with a plurality of browser cookies, each of said plurality of browser cookies indicating a geographic location associated with computing devices of a plurality of corresponding users accessing said webpage through a computing device of each respective user;

associate, by said processor, a geo tag with each of said plurality of browser cookies based on said geographic location indicated by said digital request data and a browser cookie of said plurality of browser cookies;

identify, by said processor, a subset of said plurality of browser cookies, said subset comprising browser cookies associated with said webpage and a first IP address shared by said plurality of browser cookies;

cluster, by said processor, said subset of said plurality of browser cookies into a spatial cluster comprising browser cookies associated with geo tags identifying locations located within a predefined distance of a location indicated by said digital request data and identified in a geo tag of at least one other browser cookie of said spatial cluster;

determine, by said processor, an association between a geographic location associated with a geographic center of said spatial cluster and said first IP address based on a contributing point shared by said plurality of browser cookies near a geographic center of said spatial cluster; and store, by said processor, in a memory said association between said geographic location associated with said geographic center of said spatial cluster and said first IP address.

12. The non-transitory computer-readable storage medium of claim 11, and further comprising a set of instructions to direct said processor to serve at least one digital ad to at least one of said plurality of users based on said association between said geographic location associated with said geographic center of said spatial cluster and said first IP address.

13. A system for associating a geographic location with an Internet protocol ("IP") address, the system comprising:

an IP address to location module comprising a processor and a memory, said processor operative to execute instructions stored in said memory to:

obtain, by said processor, digital request data from content of a webpage associated with a plurality of browser cookies, each of said plurality of browser cookies indicating a geographic location associated with computing devices of a plurality of corresponding users accessing said webpage through a computing device of each respective user;

associate, by said processor, a geo tag with each of said plurality of browser cookies based on said geographic location indicated by said digital request data and a browser cookie of said plurality of browser cookies;

identify, by said processor, a subset of said plurality of browser cookies, said subset comprising browser cookies associated with said webpage and a first IP address shared by said plurality of browser cookies;

cluster, by said processor, said subset of said plurality of browser cookies into a spatial cluster comprising browser cookies associated with geo tags identifying locations located within a predefined distance of a location indicated by said digital request data and identified in a geo tag of at least one other browser cookie of said spatial cluster;

determine, by said processor, an association between a geographic location associated with a geographic center of said spatial cluster and said first IP address based on a contributing point shared by said plurality of browser cookies near a geographic center of said spatial cluster; and store, by said processor, in a memory said association between said geographic location associated with said geographic center of said spatial cluster and said first IP address.

14. The system of claim 13, wherein said digital request data comprises digital ad request data.

15. The system of claim 13, wherein said digital request data is further obtained from an IP address based on shared use of said IP address by said computing devices of a plurality of corresponding users.

16. The system of claim 13, wherein said contributing point comprises said geographic location that is closest to the average of all of geographic locations associated with said plurality of browser cookies of said spatial cluster.

17. The system of claim 13, wherein said first IP address shared by said plurality of browser cookies comprises a defined range of IP addresses shared by said plurality of browser cookies.

18. The system of claim 13, wherein said IP address to location module further to determine said association between said geographic location associated with said geographic center of said spatial cluster and said first IP address based on an accuracy score determined on at least one of the following levels: a street level; a zip code level; a city level; a designated market area level; a state level; or a country level.

19. The system of claim 13, wherein said IP address to location module further to serve at least one digital ad to at least one of said plurality of users based on said association between said geographic location associated with said geographic center of said spatial cluster and said first IP address.

20. The system of claim 13, wherein said IP address to location module further to export said association between said geographic location associated with said geographic center of said spatial cluster and said first IP address to at least one of a search engine and an online advertisement service provider.

* * * * *